Patented Mar. 20, 1945

2,371,737

UNITED STATES PATENT OFFICE 2,371,737

STABILIZERS

Clarence M. Carson, Cuyahoga Falls, Ohio, assignor to Wingfoot Corporation, Akron, Ohio, a corporation of Delaware No Drawing. Application August 26, 1942,
Serial No. 456,205

5 Claims. (Cl. 260—734)

This invention relates to compositions of cyclized rubber which contains an amide formed from a dialkanol amine and a resin acid or a hydrogenated resin acid. The amide is used to stabilize and/or plasticize the cyclized rubber. The dialkanol amine is one having the formula:

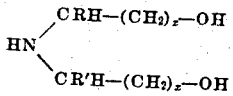

where R and R' are alike or unlike and may be hydrogen or an alkyl group containing no more than three carbons, i. e., methyl, ethyl or a propyl. By a resin acid is meant abietic acid or pimaric acid or other resin acid, such as those mentioned in Richter's Organic Chemistry, vol. 2 (1930 ed.), pp. 348, seq. The resin acids are obtained from natural resins, such as the rosin from the southern pine tree and resins from other types of pine trees. It also includes the acids obtained from copal, kauri, gum lac, and other East Indian gums.

The cyclized rubbers form particularly good moisture-proofing coatings and are used for other purposes, such as paints, etc. The stabilizers of this invention may be used with cyclized rubbers for any of these purposes. They are soluble in the cyclized rubbers, even in comparatively high percentages, and exert a continued stabilizing and plasticizing effect.

The cyclized rubbers with which the stabilizers of this invention may be used include the products obtained by cyclizing rubber with a phenol sulfonic acid, hydro fluoric acid, tin tetrachloride, boron fluoride, chlorostannic acid, or any other cyclizing agent, or by heating.

The stabilizers and plasticizers of this invention are prepared by heating the resin acid or hydrogenated resin acid with a dialkanol amine of the given formula. Diethanol amine is a preferred amine for use in the reaction. Other members include either of the dipropanol amines (i. e., either the compound containing two chains of three methylene groups each—where $x$ of the above formula is 3; or the compound containing two branched chains—where R and R' of the above formula are methyl groups and $x$ is 2), or the dibutanol amine where R and R' of the above formula are ethyl groups, etc. The reaction is illustrated by the following equation in which abietic acid is reacted with diethanol amine, and R represents the residue of the acid:

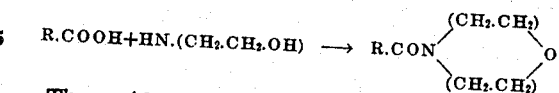

The amide is formed by heating the dialkanol amine and the resin acid until all the water has been driven off of the compound. This dehydrates the two alkanol groups and condenses the carboxyl and amine groups. For instance, in forming the stabilizer from diethanol amine and abietic acid, equimolecular proportions of the two materials are heated at a temperature, for example, of 190-200° C. until all of the water has been driven off.

The stabilizer and plasticizer obtained in this way or any other stabilizer or plasticizer of this general class will be found to have very low vapor pressure. It is miscible with the cyclized rubber in relatively large portions. A small amount of the compound, for example 4 or 5 per cent by weight based on the weight of the cyclized rubber, will be found to have a decided stabilizing influence on the cyclized rubber. For instance, when a sheet of wrapping material, such as paper, etc., is coated with a composition containing an unstabilized cyclized rubber, it will be found that after several months standing the coating loses its heat-sealing properties. The presence of such a small amount of one of the stabilizers of this invention will prevent or retard the loss of heat-sealing properties. Furthermore, a heat-seal formed with unstabilized cyclized rubber on standing deteriorates and weakens. The presence of several percent of one of the stabilizers of this invention in the coating composition from which such a heat seal is formed will prevent or retard the deterioration of the cyclized rubber and the weakening of the heat seal.

The stabilizers of this invention have a plasticizing effect on the cyclized rubbers when added thereto in amounts of 5 to 25 per cent. They are highly compatible with the cyclized rubbers and because of their low vapor pressure are persistent and form enduring plasticizers which increase the flexibility and improve the feel of the plasticized product. They stabilize as well as plasticize and may be termed stabilizer-plasticizers.

The use of the stabilizers is illustrated by the following formula, which is suitable for coating metal foil, sulfite paper, glassine paper, casein film, regenerated cellulose or other wrapping material to render it moisture-proof and heat-sealable:

| | Parts |
|---|---|
| Cyclized rubber | 20 |
| Paraffin wax | 3 |
| Stabilizer | 0.8 |
| Toluol | 76.2 |

The cyclized rubber may be Pliolite (manufactured by The Goodyear Tire & Rubber Company) with a distortion point up to 75° C. The paraffin wax may be any one which melts between 110–170° F.

It was found that when glassine paper was coated with 2.5 to 3.0 pounds (dry weight) per three-thousand-foot ream of a cyclized rubber coating containing the stabilizer formed from diethanol amine and abietic acid, and the coating was dried in an oven at 160–175° F. for 45 to 60 seconds, a highly moisture-proof coating was obtained. The coating readily heat sealed at 250–350° F. On comparing the above coating applied to various flexible base materials with identical sheets coated with the same formula without the stabilizer, it was found that the stabilized coating retained its heat-sealing properties several times as long as the unstabilized coating; and the ability of the seal to hold after it had been made persisted for several times the life of the seal made from the unstabilized coating.

The formula of the coating composition may, of course, be varied. Different waxes may be added in different amounts together with other filling materials, dyestuffs, etc. The wax may be omitted if moisture proofness is not essential.

It has been found that by adding to the above coating composition a small amount of any cyclohexyl piperazine, such as for example di-ortho-methyl cyclohexyl piperazine, together with the amide stabilizer of this invention, greater stabilization was obtained than by using the amide alone. For example, a coating containing 5 per cent of the amide and 4 per cent of di-ortho-methyl cyclohexyl piperazine was several times more stable than material to which no stabilizer at all had been added, and was more stable than an identical coating containing the amide, but no cyclohexyl piperazine.

What I claim is:

1. A plastic cyclized rubber composition which contains an amide formed from an acid of the class consisting of the natural resin acids and hydrogenated natural resin acids and a dialkanol amine having the formula

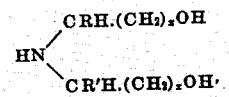

where R is from the class consisting of hydrogen and alkyl groups containing no more than three carbons, R' is from the class consisting of hydrogen and alkyl groups containing no more than three carbons, and $x$ is a whole number no greater than 2, the amount of the amide present ranging from a small amount to serve as a stabilizer up to and including about 25 per cent to act as a plasticizer.

2. The plastic cyclized rubber composition of claim 1 which contains a cyclohexyl piperazine.

3. A plastic cyclized rubber composition which contains an amide formed from a diethanol amine and an acid of the class consisting of the natural resin acids and the hydrogenated natural resin acids, the amount of the amide present ranging from a small amount to serve as a stabilizer up to and including about 25 per cent to act as a plasticizer.

4. A plastic cyclized rubber composition which contains an amide formed from abietic acid and diethanol amine, the amount of the amide present ranging from a small amount to serve as a stabilizer up to and including about 25 per cent to act as a plasticizer.

5. A plastic cyclized rubber composition which contains as a stabilizer and plasticizer between 5 and 25 per cent of the amide derived from abietic acid and diethanol amine.

CLARENCE M. CARSON.